(12) United States Patent
Oh et al.

(10) Patent No.: US 8,433,377 B1
(45) Date of Patent: *Apr. 30, 2013

(54) EXPENDABLE AND COLLAPSIBLE SOUND AMPLIFYING CELLULAR PHONE CASE

(76) Inventors: Kwang J Oh, La Crescenta, CA (US); Loren Oh, Irvine, CA (US); Austin Oh, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/552,539

(22) Filed: Jul. 18, 2012

Related U.S. Application Data

(63) Continuation-in-part of application No. 13/403,947, filed on Feb. 23, 2012.

(51) Int. Cl.
*H04M 1/00* (2006.01)

(52) U.S. Cl.
USPC ............... 455/575.1; 345/158; 455/556.1; 455/575.8; 381/322

(58) Field of Classification Search .......... 455/455, 455/575.1, 550.1, 575.8, 575.4, 90.1, 569.1; 396/62; 239/203; 403/24; 473/417; 345/158, 345/31; 381/322, 174, 386
See application file for complete search history.

(56) References Cited

U.S. PATENT DOCUMENTS

| 5,046,104 | A  | * | 9/1991 | Kloss | 381/335 |
|---|---|---|---|---|---|
| 2005/0110752 | A1 | * | 5/2005 | Pedersen et al. | 345/158 |
| 2007/0095871 | A1 | * | 5/2007 | Chen | 224/219 |
| 2008/0227506 | A1 | * | 9/2008 | Corrigan et al. | 455/575.5 |

* cited by examiner

*Primary Examiner* — Mahendra Patel
(74) *Attorney, Agent, or Firm* — John K. Park; Park Law Firm

(57) ABSTRACT

A case is for a mobile device. The mobile device case comprises a body, a pop-up plate, an outer support plate, an inner support plate, wedge-shape bellow sound amplifier, first magnets, and a spring device. The pop-up plate has an edge hinged to a portion of the body so as to cover the cut-out opening of the body. The inner support plate is provided on an inner surface of the base groove so as to cover the cut-out opening, and the inner support plate comprises sound-guiding holes for guiding sound from the mobile device into a gap inside. The wedge-shape bellow sound amplifier is provided between the outer support plate and the inner support plate configured for amplifying the sound through the one or more sound-guiding holes from the mobile device.

20 Claims, 13 Drawing Sheets

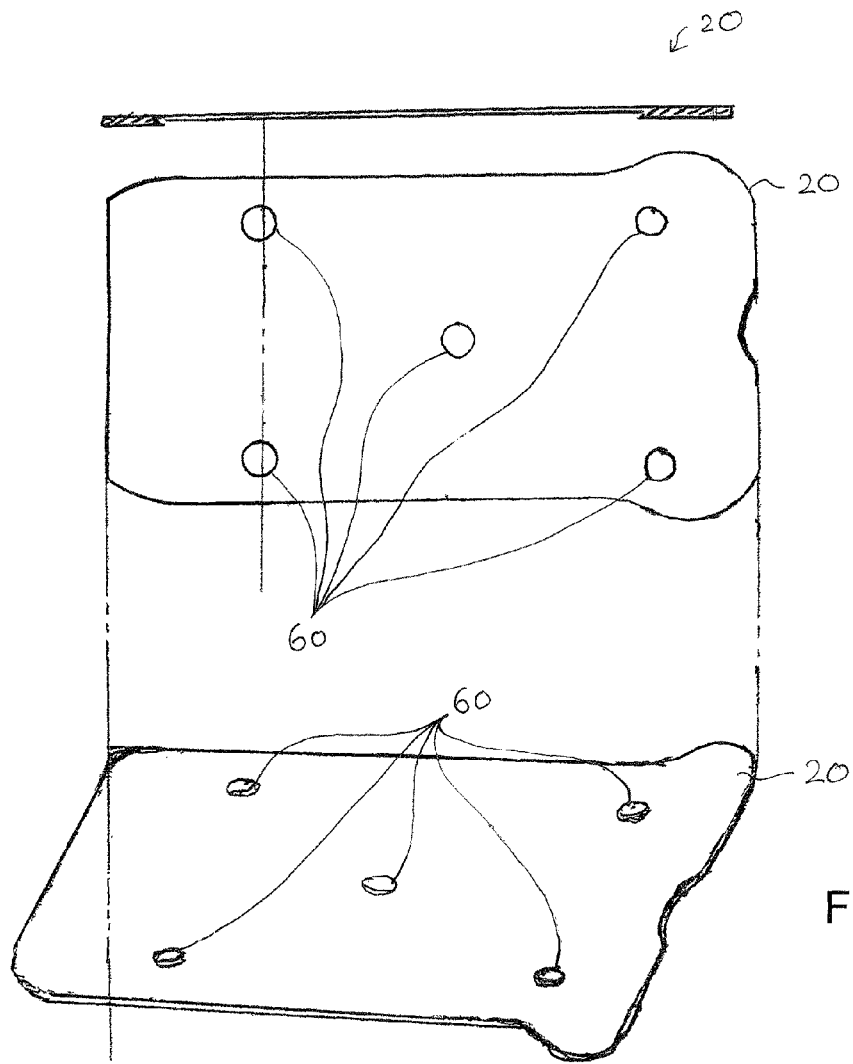
Fig. 9
Fig. 10
Fig. 11
Fig. 12

EXPENDABLE AND COLLAPSIBLE SOUND AMPLIFYING CELLULAR PHONE CASE

RELATED APPLICATION

This application is a continuation-in-part of U.S. patent application Ser. No. 13/403,947 for "EXPENDABLE AND COLLAPSIBLE SOUND AMPLIFYING CELLULAR PHONE CASE" filed on Feb. 23, 2012.

BACKGROUND OF THE INVENTION

The present invention relates to an expendable and collapsible sound amplifying cellular phone case.

A cellular phone is like a body part to a modern human being. However, cellular phone itself may be too customized to a basic functions by the manufacturers.

A need for an expendable and collapsible sound amplifying cellular phone case has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide an expendable and collapsible sound amplifying cellular phone case.

A case is for a mobile device with a front face, a rear face, a top edge, a bottom edge, two side edges, a camera lens, and a speaker.

The mobile device case comprises a body, a pop-up plate, an outer support plate, an inner support plate, wedge-shape bellow sound amplifier, a plurality of first magnets, and a spring device.

The body is for covering the rear face of the mobile device, and comprises a plurality of fastening portions configured to fasten the mobile device, a plurality of utility holes for exposing portions of the mobile device, a base groove, and a cut-out opening provided at a part of the base groove.

The pop-up plate has an edge hinged to a portion of the body so as to cover the cut-out opening of the body.

The outer support plate is provided on an inner surface of the pop-up plate.

The inner support plate is provided on an inner surface of the base groove so as to cover the cut-out opening, and the inner support plate comprises one or more sound-guiding holes for guiding sound from the mobile device into a gap between the inner support plate and the pop-up plate.

The wedge-shape bellow sound amplifier is provided between the outer support plate and the inner support plate configured for amplifying the sound through the one or more sound-guiding holes from the mobile device.

The plurality of first magnets are provided in the pop-up plate for attracting and holding the pop-up plate to the outer support plate.

The spring device is provided between the pop-up plate and the inner support plate through a first hole provided in the outer support plate and a second hole provided through the wedge-shaped bellow sound amplifier, configured for opening the wedge-shaped bellow sound amplifier along with the pop-up plate.

The plurality of first magnets and the spring device are configured such that the pop-up plate is kept closed when the pop-up plate is forced to be closed against the cut-out opening and is flipped open when the pop-up plate is detached and opened by a predetermined angle with respect to the hinging edge.

The body may be made by an injection molding.

The plurality of fastening portions may be provided at four corners thereof corresponding to four corners of the mobile device.

Each of the plurality of fastening portions may comprise an elastic grasping protrusions configured to extend over and hold the corresponding corner of the mobile device.

The depth of the base groove may be substantially same as a thickness of the pop-up plate.

The pop-up plate may comprise a thumbnail cut-out portion for opening.

The case of claim 1, wherein body may further comprise a thumbnail cut-out portion provided next to an edge of the base groove for opening the pop-up plate.

The outer support plate may be attached to an inner surface of the pop-up plate.

The wedge-shaped bellow sound amplifier may comprise fan-shaped bellows provided at both sides thereof, and the fan-shaped bellows may be configured to limit the opening of the pop-up plate to the predetermined angle.

The pop-up plate may be connected to the body by a hinge.

Each of the first magnets may be embedded in the pop-up plate.

The pop-up plate may further comprise a plurality of first protrusions for elevating the surface of the pop-up plate off a floor and preventing it from scratch.

Some of the plurality of protrusions may be aligned with the first magnets.

The spring device may comprise a plate spring.

The plate spring may be provided at the edge of the pop-up plate hinged to the portion of the body, by heat-treating the edge.

The body may further comprise a plurality of second protrusions for elevating the surface of the pop-up plate off a floor and preventing it from scratch.

A height of the second protrusion may be higher than a height of the first protrusion.

The case may further comprise a plurality of second magnets disposed on an outer surface of the body so as to have the case and the mobile device stick to an external metal surface.

Each of the second magnets may protrude more by a predetermined height than the first magnets.

The advantages of the present invention are: (1) the case can be applied to mobile devices easily; (2) the case amplifies the sound from the mobile devices; (3) the case can deploy the sound amplifying device easily; and (4) the case can be used to turn the mobile device into a hand-free device.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 9 is a cross-sectional view of a pop-up plate according to an embodiment of the invention;

FIG. 10 is a front view of a pop-up plate according to still another embodiment of the invention;

FIG. 11 is a perspective view of the pop-up plate of FIG. 10;

FIG. 12 is a perspective view of an outer support plate according to an embodiment of the invention;

DETAILED DESCRIPTION EMBODIMENTS OF THE INVENTION

Figure 1:
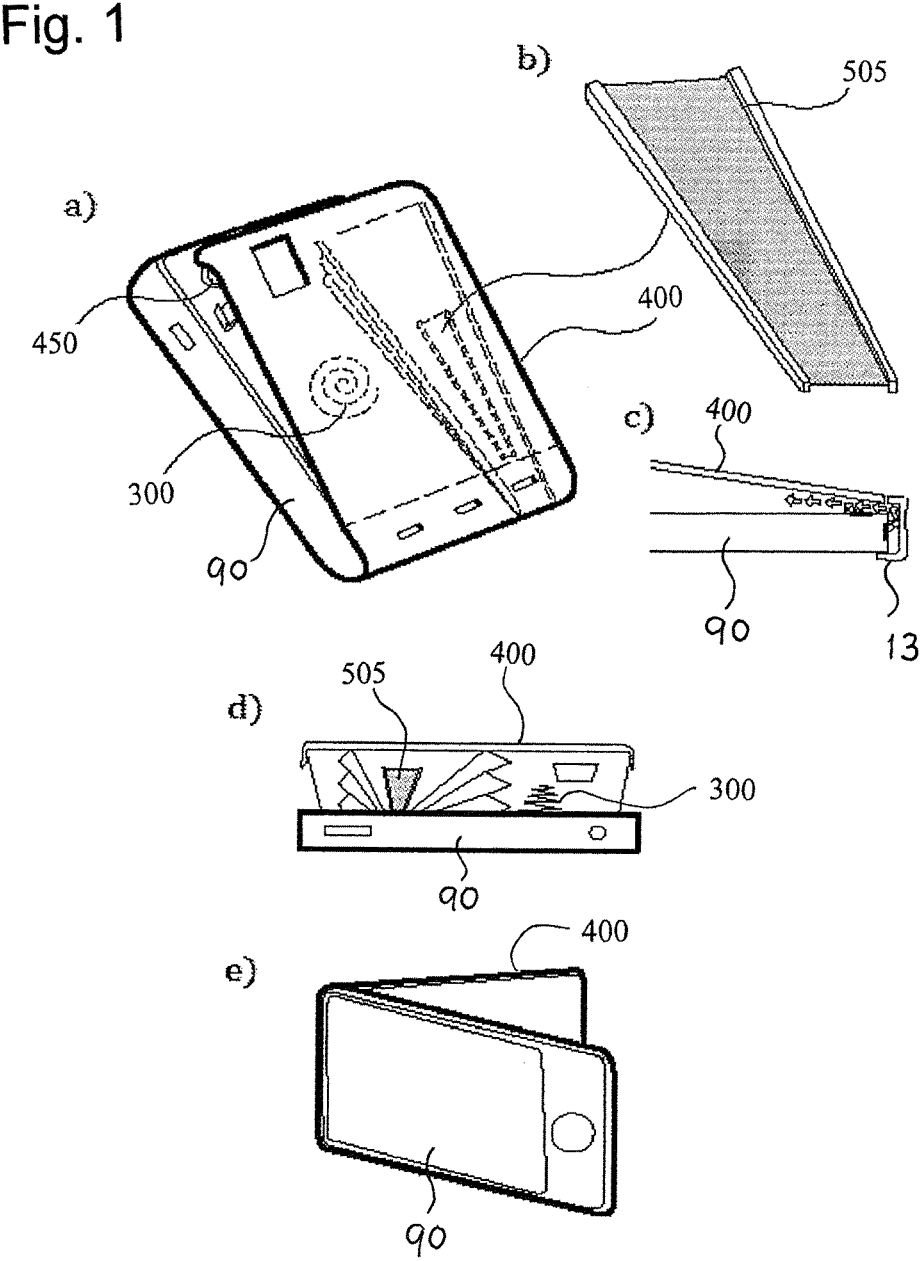
FIG. 1a) is a perspective view of a case installed and opened in a cell phone according to an embodiment of the invention.
FIG. 1b) is a perspective view of a membrane of a sound amplifier in FIG. 1a)
FIG. 1c) is a side view of the end side of a cell phone stationary case opened.
FIG. 1d) is a cross-sectional view of the case when opened.
FIG. 1e) is a side view of the cell phone when the case is opened.

The U.S. patent application Ser. No. 13/403,947 is incorporated by reference into this disclosure as if fully set forth herein.

An aspect of the invention provides a cell phone protective case, which is disclosed with sound outlets located in the right and left sides and the bottom perimeters, of a cell phone create appreciable sound effects, is disclosed. The frame interior comprises of three sectional chambers with the bottom layer mainly covering the horizontal coverage axis. The top two layers, gradually decreasing in width to modify the frequencies in piecemeal together with the bottom chamber, create a more seasonal listening experience.

The present invention is a slightly denser case frame, where the frame is equipped with an interior "reverse-engineering" chamber. Depending on the circumstances, as noted previously, the timbre and overall intensity of the emanating sound are often baffled. This lowers the sophistication of the devices' multiple speaker-like-qualities such as: 1) music listening, 2) real-time driving directions, 3) schedule announcements, 4) two-way dialogue, 5) videos, and 6) television. In other words, today's mobile-phone has become a multi-function media device in which sophisticated sound transmission is of central importance and high demand.

The present invention was engineered according to a basic biological analogue of the human ear. After sound starts with the vibration of some material object, or voice, the vibrations strike the eardrum and get amplified by tiny bones in the middle ear, striking the cochlea. The membrane that separates the different chambers in the cochlea varies in stiffness, causing each section to vibrate at a different frequency.

Based on the biological reality of these neural signals within one cerebrum appreciating-sound, it is an object of the present invention to reverse-engineer the otherwise entwined higher pitched frequencies en route, more in piecemeal. The frequencies are channeled en route thru the bottom sectional layer, where they are "de-pressed" to create lower pitched sounds. The preferred arrangement of the reverse-engineering chamber is operatively associated with the originating speaker thru a throat piece caused an "O-ring." The "O-ring" is a circular member that clamps onto/over the originating speaker, in which the initially restricted area of the throat prevents the passage of air, thus serving as an impedance matching mechanism.

In this arrangement, as the energy of wave motion is propagated outward from the center of disturbance, or the originating speaker located on the rear panel of said mobile-phone device, the reverse-engineering chamber channels the lower frequencies a "de-press" bottom sectional layer. The bottom section is lines with a loose membrane/material, resembling the membranes that separate the different chambers in the cochlea. The wall lining or thin "membranes" impel the lower-pitched sounds through the speakers located on the outer rims of the device. The top sectional layers, occupying a smaller area along the horizontal coverage axis, channel the higher-pitched frequencies through an area line with a stiffer membrane/material. Because most sounds are a composite of frequencies, the reverse-engineering process effectively delivers the pre-entwined lower-pitched frequency en route by piecemeal, thereby creating a more seasoned listening experience.

FIG. 1(a) depicts detailed drawing of the expendable and collapsible sound amplifying cellular phone case when opened. The sound amplifying vibrating membrane 505 is attached to the cell phone stationary cover case 400. The camera lens 450 lies under the call phone stationary cover case. The spring 300 that holds the cell phone stationary case, depicted as dotted circular shaped drawing, is compressed and elongated when the case is pressed down; FIG. 1(b) depicts enlarged drawing of the sound amplifying vibrating membrane 505; FIG. 1(c) depicts the side view of the end side of the cell phone stationary case when opened. The sound is emitted from the cell phone speaker attached at the end side of the cell phone, through the small gap created in between the cell phone and the cell phone case; FIG. 1(d) shows cross sectional view of the expendable and collapsible sound amplifying cellular phone case when opened. FIG. 1(e) shows side view of the cell phone of when the case is opened. In order for the sound to be properly amplified, the sound amplifying vibrating membrane 505 should be expanded from the stationary speaker case 400. Once the sound is amplified, the sound can be exited through the gap created in between the case 400 and the stationary expander case 505. This is the preferred embodiment of the invention.

Figure 2:
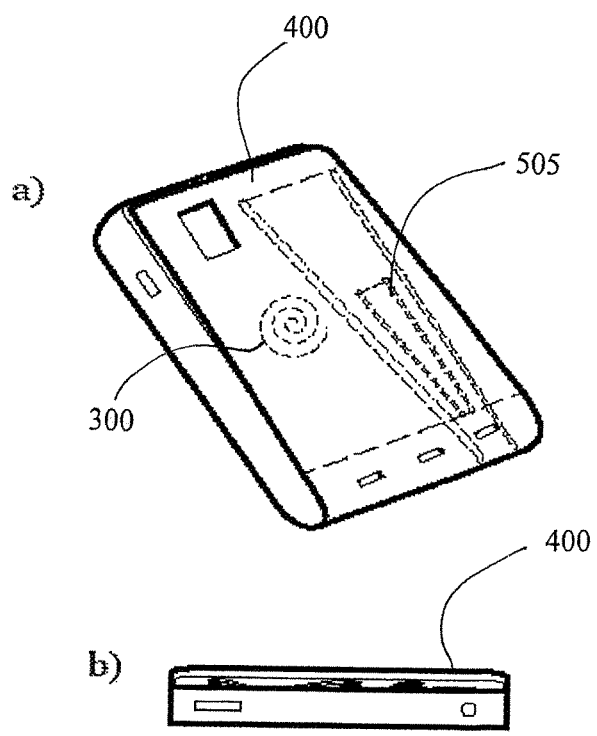
FIG. 2a) is a perspective view of a case installed and closed.
FIG. 2b) is a cross-sectional view of the case when closed.
Figure 3:
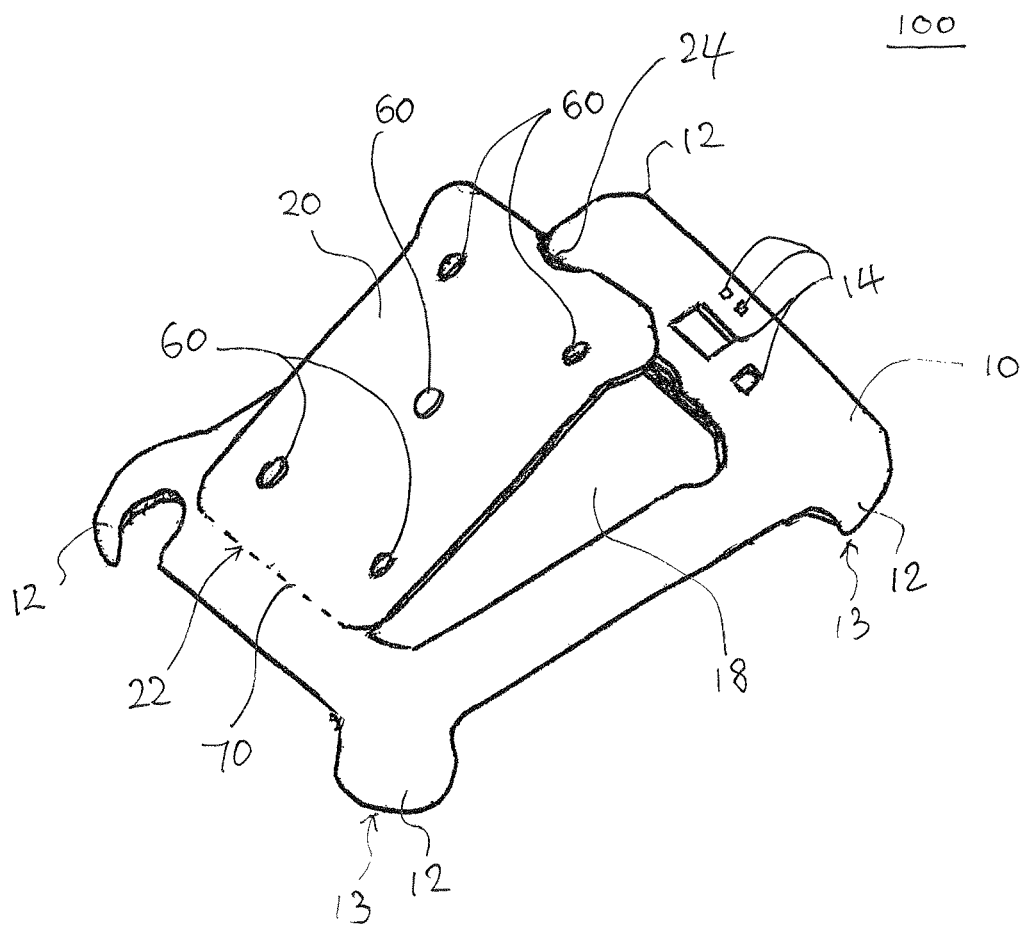
FIG. 3 is a perspective view showing a mobile device case according to another embodiment of the invention.
Figure 4:
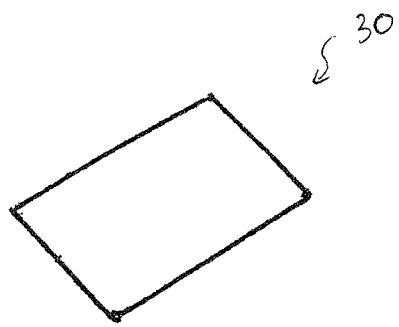
FIG. 4 is a perspective view showing an outer support plate according an embodiment of the invention.

FIG. 2(a) contains detailed drawing of the back of the cell phone sound amplifier foldable case when closed; FIG. 2(b) depicts cross sectional view of the expendable and collapsible sound amplifying cellular phone case when closed.

1) A cell phone protective case, with expander of sound outlet located on the right and left side and the bottom perimeters, of a cell phone, wherein the frame interior is comprised of a circular throat member for sound impedance, matching to create an improved coupling effect between the original speaker, and the air, where the frame interior is comprised of sectional chambers covering both the horizontal and vertical coverage axis to change the directional characteristics of sound waves to amplify and channel the sound en route towards the outer perimeters of the device, wherein expendable and collapsible stationary speaker case pops up when pressed down, as the spring sustaining the expander is compressed and expanded.

2) The cell phone protective case in 1) is used as a stand when the case is slightly opened and laid across the table.

3) The cell phone protective case in 1) is used as a video viewing stand when the case is slightly opened and laid across the table.

The cell phone protective case, with expander of sound outlet located on the right and left sides and the bottom perimeters, of a cell phone is invented. The frame interior is comprised of a circular throat member for sound impedance, matching to create an improved coupling effect between the original speaker, and the air, where the frame interior is comprised of sectional chambers covering both the horizontal and vertical coverage axis' to change the directional characteristics of sound waves to amplify and channel the sound en route towards the outer perimeters of the device.

Another aspect of the invention provides an expendable and collapsible sound amplifying mobile device case 100 as shown in FIGS. 3-26.

A case 100 is for a mobile device 90 with a front face, a rear face, a top edge, a bottom edge, two side edges, a camera lens, and a speaker.

The mobile device case 100 comprises a body 10, a pop-up plate 20, an outer support plate 30, an inner support plate 40, a wedge-shape bellow sound amplifier 50, a plurality of first magnets 60, and a spring device 70.

The body 10 is for covering the rear face of the mobile device 90, and comprises a plurality of fastening portions 12 configured to fasten the mobile device 90, a plurality of utility holes 14 for exposing portions of the mobile device 90, a base groove 16, and a cut-out opening 18 provided at a part of the base groove 16.

The pop-up plate 20 has an edge 22 hinged to a portion of the body 10 so as to cover the cut-out opening 18 of the body 10.

Figure 7:
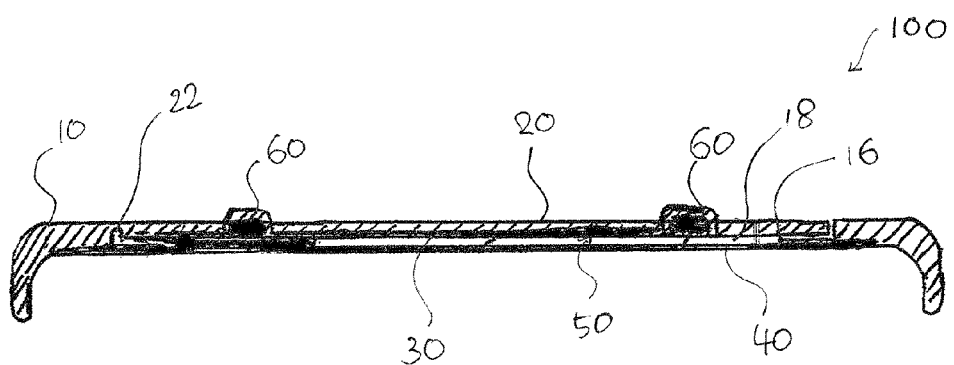
FIG. 7 is a cross-sectional view showing a mobile device case according to still another embodiment of the invention.
Figure 8:
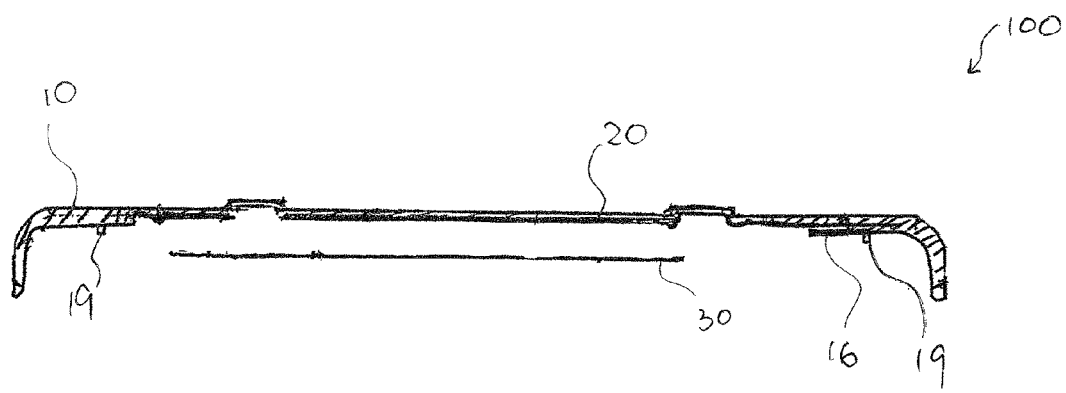
FIG. 8 is an exploded cross-sectional view showing the mobile device of FIG. 7.
Figure 8:
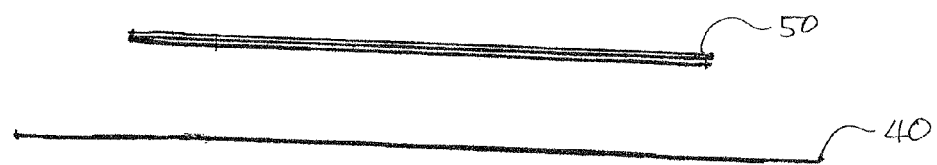

The outer support plate 30 is provided on an inner surface of the pop-up plate 20 as shown in FIGS. 7 and 8.

Figure 6:
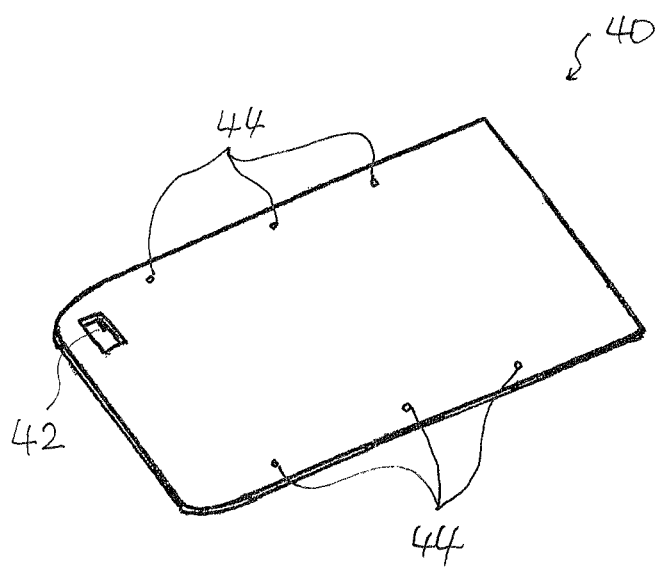
FIG. 6 is a perspective view showing an inner support plate according an embodiment of the invention.

The inner support plate 40 is provided on an inner surface of the base groove 16 so as to cover the cut-out opening 18, and the inner support plate 40 comprises one or more sound-guiding holes 42 for guiding sound from the mobile device 90 into a gap between the inner support plate 40 and the pop-up plate 20 as shown in FIG. 6.

The wedge-shape bellow sound amplifier 50 is provided between the outer support plate 30 and the inner support plate 40 configured for amplifying the sound through the one or more sound-guiding holes 42 from the mobile device 90.

The plurality of first magnets 60 are provided in the pop-up plate 20 for attracting and holding the pop-up plate 20 to the outer support plate 30.

The spring device 70 is provided between the pop-up plate 20 and the inner support plate 40, configured for opening the wedge-shaped bellow sound amplifier 50 along with the pop-up plate.

The plurality of first magnets 60 and the spring device 70 are configured such that the pop-up plate 20 is kept closed when the pop-up plate 20 is forced to be closed against the cut-out opening 18 and is flipped open when the pop-up plate 20 is detached and opened by a predetermined angle with respect to the hinging edge 22.

The body 10 may be made by an injection molding.

The plurality of fastening portions 12 may be provided at four corners thereof corresponding to four corners of the mobile device 90 as shown in FIG. 1.

Each of the plurality of fastening portions 12 may comprise an elastic grasping protrusions configured to extend over and hold the corresponding corner of the mobile device 90.

Figure 24:
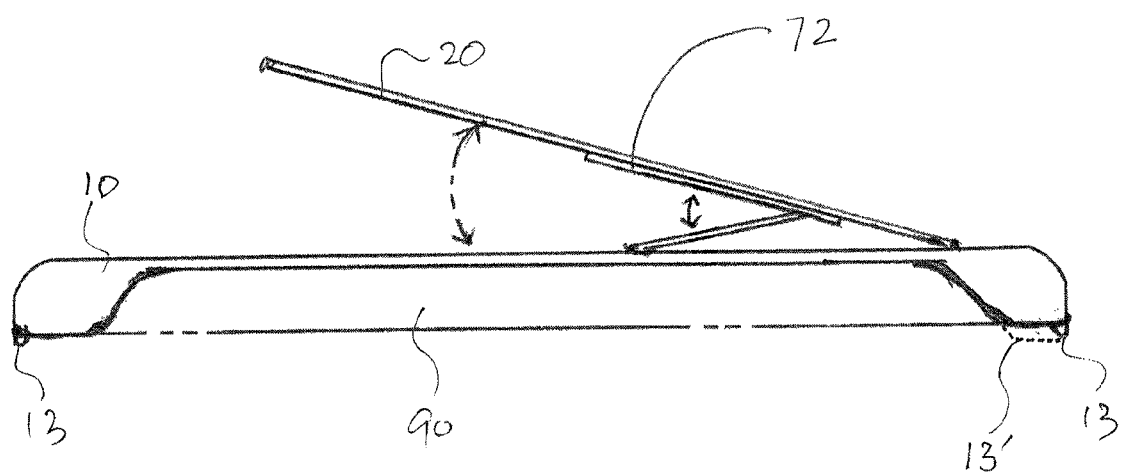
FIG. 24 is a side view showing a mobile device case installed with a mobile device according to an embodiment of the invention.

Each of the plurality of fastening portions 12 may further comprise an elevating protrusion 13 for lifting a front surface of the mobile device 90 off a floor as shown in FIGS. 1(c) and 24.

The depth of the base groove 16 may be substantially same as a thickness of the pop-up plate 20. The base groove 16 may be located anywhere around the edge of the cut-out opening 18 to facilitate access of a finger or fingernail of the user for opening the pop-up plate 20.

The pop-up plate 20 may comprise a thumbnail cut-out portion 24 for opening. The base groove 16 may be below and around such a thumbnail cut-out portion 24 so as to prevent the pop-up plate 20 from being flipped in.

In certain embodiments of the invention, the thumbnail cut-out portion 24 for opening may be provided at other portion such as sides of the pop-up plate 20.

Alternatively, the body 10, instead of the pop-up plate 20, may further comprise a thumbnail cut-out portion (not shown) provided next to an edge of the base groove 16 for opening the pop-up plate 20.

The outer support plate 30 may be attached to an inner surface of the pop-up plate 20. In certain embodiments, they may be glued to each other.

Figure 5:
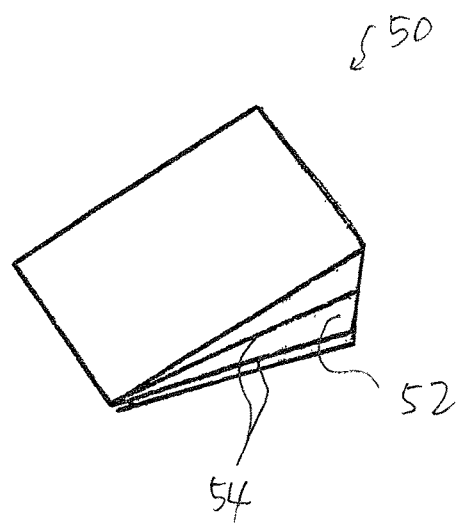
FIG. 5 is a perspective view showing a wedge-shaped bellow sound amplifier according an embodiment of the invention.
Figure 13:
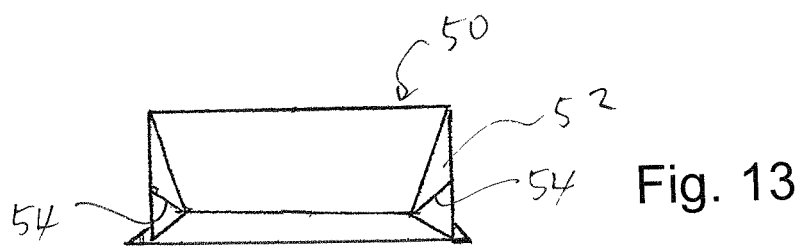
FIG. 13 is a top view showing a mobile device case when the pop-up plate is opened according to still another embodiment of the invention.
Figure 15:
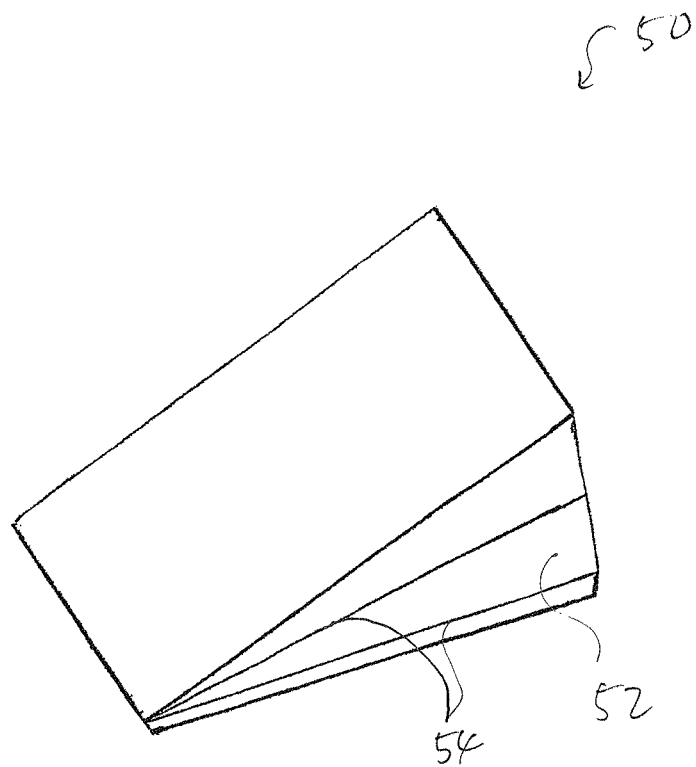
FIG. 15 is a perspective view showing a wedge-shaped bellow sound amplifier according an embodiment of the invention.
Figures 16, 17:
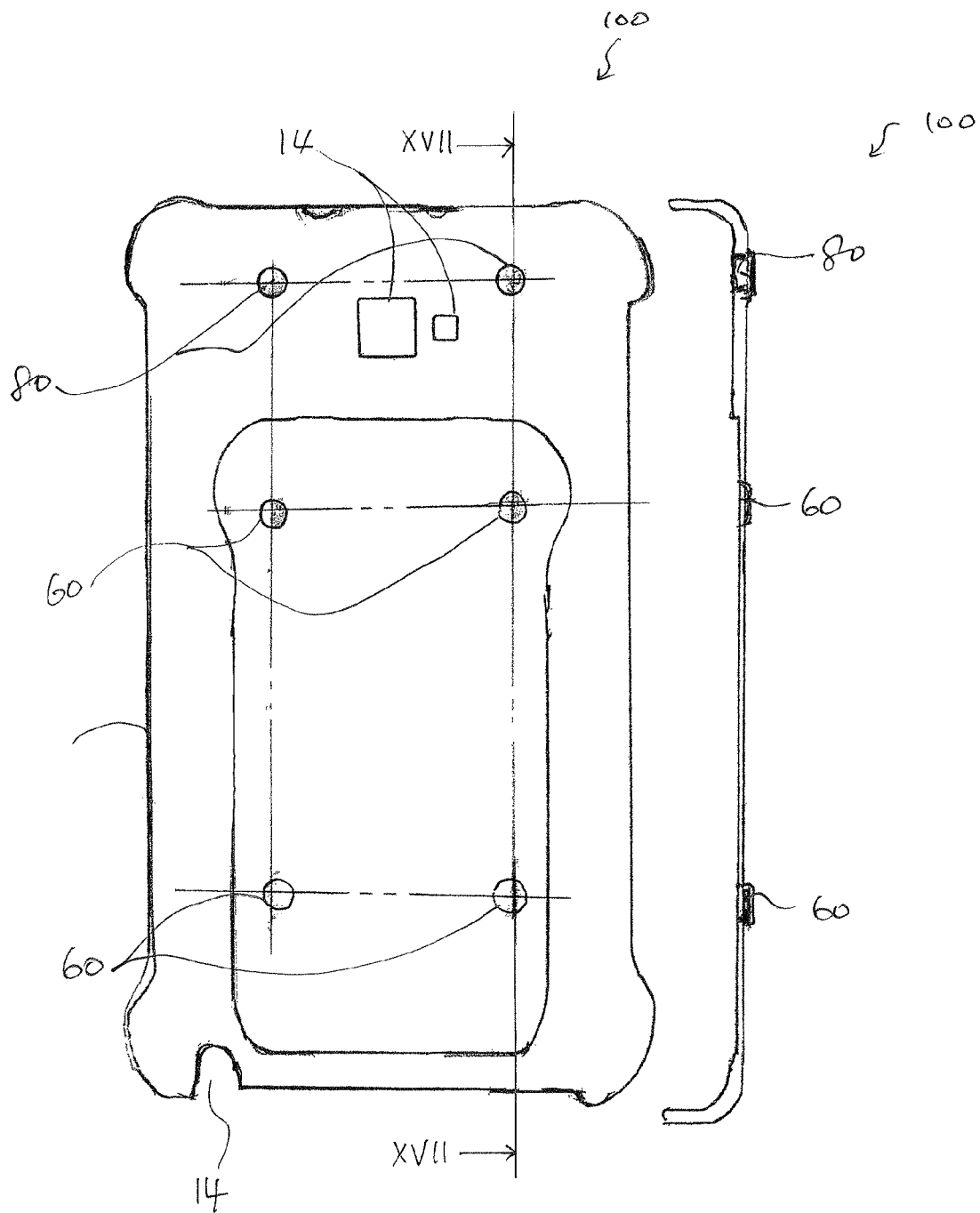
FIG. 16 is a top plan view of a mobile device case according to still another embodiment of the invention.
FIG. 17 is a cross-sectional view of FIG. 16 along line XVII-XVII.

The wedge-shaped bellow sound amplifier 50 may comprise fan-shaped bellows 52 provided at both sides thereof as shown in FIGS. 5, 13, 15, and the fan-shaped bellows 52 may be configured to limit the opening of the pop-up plate 20 to the predetermined angle.

The pop-up plate 20 may be connected to the body 10 by a hinge.

Figure 18:
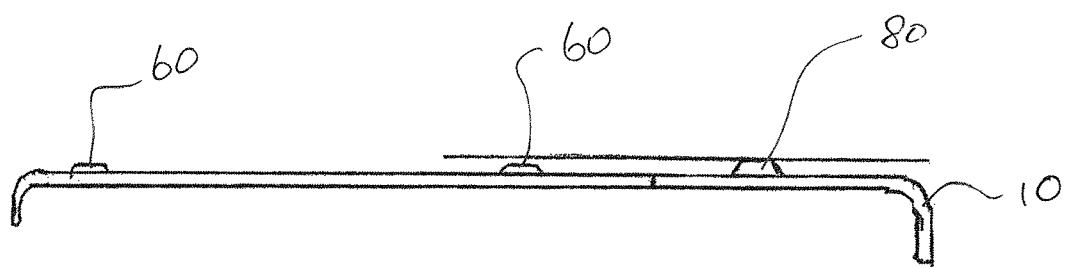
FIG. 18 is a cross-sectional view of a body and magnets according to an embodiment of the invention.
Figure 19:
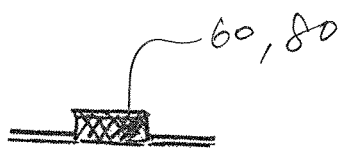
FIG. 19 is an enlarged cross-sectional view of a magnet of FIG. 18.

Each of the first magnets 60 may be embedded in the pop-up plate 20 as shown in FIGS. 7, 18, 19.

Figure 25:
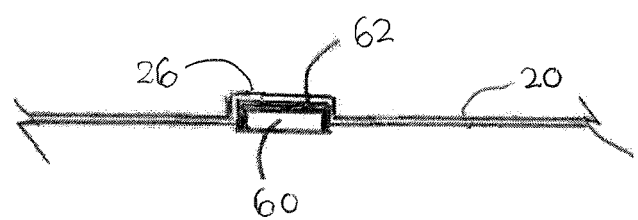
FIG. 25 is a partial cross-sectional view showing a magnet embedded in a pop-up plate according to an embodiment of the invention.
Figure 26:
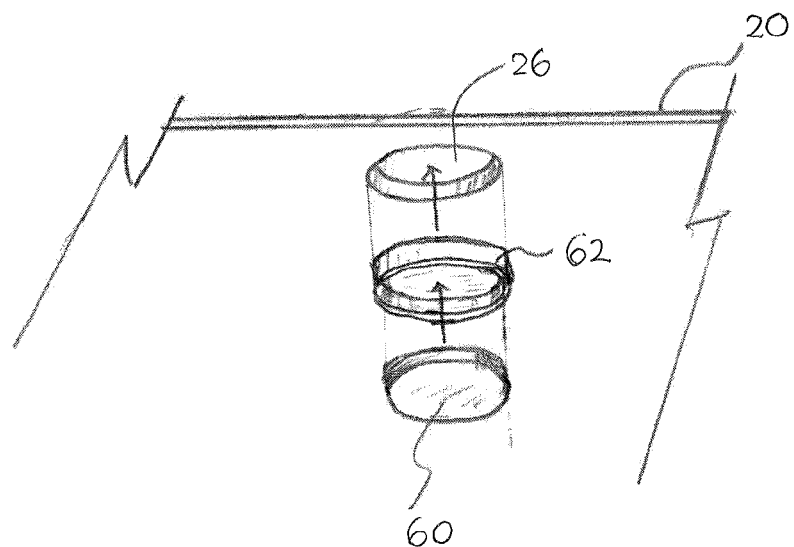
FIG. 26 is a partial perspective view showing the magnet of FIG. 25.

In certain embodiments, each of the first magnets 60 may be covered by a metal cap 62 provided between the pop-up plate 20 and the first magnet 60 so as to reduce leaking of magnetic field outward as shown in FIGS. 25 and 26. Thereby the chance to mess up information in a magnetic tape of credit cards and the like.

The metal cap 62 may have a shape of a disc with an open end as shown in FIG. 26. The magnet 60 may be attached to the metal cap 62 by gluing or other appropriate means.

The combination of the magnet 60 and the metal cap 62 may be plugged in and fixed in a receiving groove 26 provided in the pop-up plate 20 as shown in FIGS. 25 and 26.

The pop-up plate 20 may further comprise a plurality of first protrusions (not shown) for elevating the surface of the pop-up plate 20 off a floor and preventing it from scratch.

Some of the plurality of protrusions may be formed alike and aligned with the first magnets 60.

The spring device 70 may comprise a plate spring as shown in FIGS. 20-23.

The plate spring may be provided at the edge 22 of the pop-up plate 20 hinged to the portion of the body 10, by heat-treating the edge 22.

The body 10 may further comprise a plurality of second protrusions (not shown) for elevating the surface of the pop-up plate 20 off a floor and preventing it from scratch.

A height of the second protrusion may be higher than a height of the first protrusion.

The case may further comprise a plurality of second magnets 80 disposed on an outer surface of the body 10 so as to have the case and the mobile device stick to an external metal surface. In certain embodiments, the second protrusions may look like the second magnets 80.

Each of the second magnets 80 may protrude more by a predetermined height than the first magnets 60.

In certain embodiments of the invention, the wedge-shape bellow sound amplifier 50 may comprise two bellows portions 52, each of which covering side wedge-shape gap between the pop-up plate 20 and the body 10 with substantially right angle with respect to each of the pop-up plate 20 and the body 10, wherein each bellow 52 comprises a plurality of radial creases 54 as shown in FIGS. 5, 13, and 15.

Each bellow 52 may be fixed to either the pop-up plate 20 or the body 10 through gluing or other mechanical fasteners (not shown).

In these embodiments, the outer support plate 30 may not be needed.

In certain embodiments of the invention, the spring device 70 may comprise a pin spring 72 provided between the pop-up plate 20 and the body 10 as shown in FIGS. 20-24.

Figure 20:
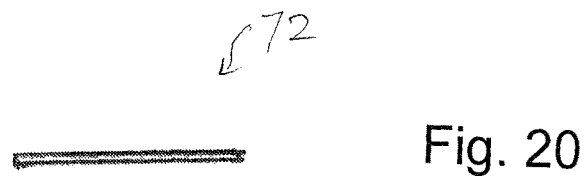
FIG. 20 is a side view of a plate spring that is closed according to an embodiment of the invention.
Figure 21:
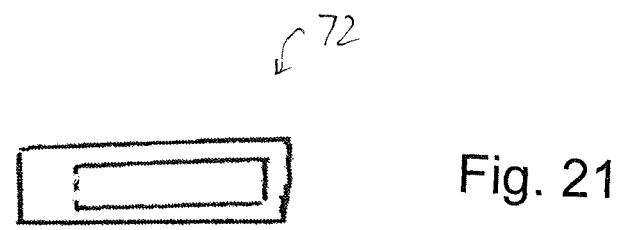
FIG. 21 is a top view of the plate spring of FIG. 20 when closed.
Figure 22:
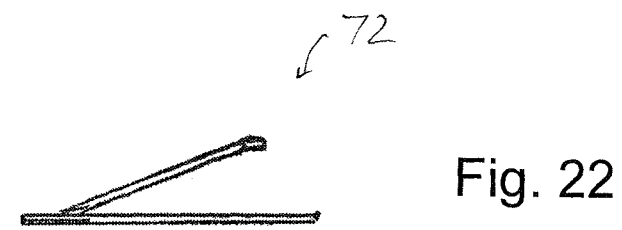
FIG. 22 is another side view of the plate spring that is opened.
Figure 23:
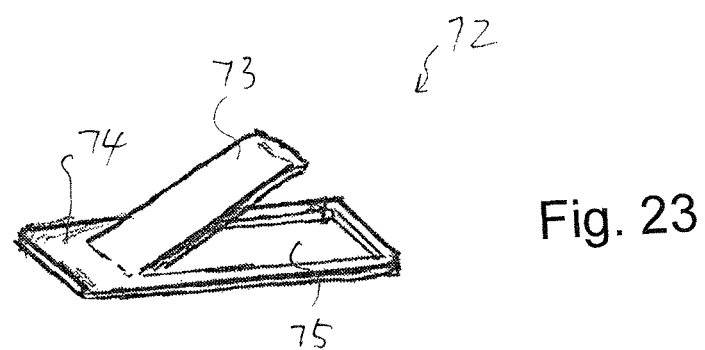
FIG. 23 is a perspective view of the plate spring of FIG. 22.

The pin spring 72 may comprise a pop-up portion 73, a base portion 74, and a cut-out portion 75 provided in the base portion 74. The pop-up portion 73 is flipped up or opened and remained so under no external force applied, as shown in FIGS. 22 and 23. Under pressure or external force, the pin spring 72 is closed down with the pop-up portion 73 back in the cut-out portion 75 as shown in FIGS. 20 and 21.

The pin spring 72 may be installed by fixing the base portion 74 to the inner surface of the pop-up plate 20. In an embodiment, the base portion 74 may be fixed by gluing.

The pop-up portion 73 may be bent slightly as shown in FIGS. 22 and 23, so as to touch and slide freely over the inner support plate 40 in opening and closing the pop-up plate 20 as shown in FIG. 24.

In FIG. 24, the elevating protrusion 13 is shown as a pointed protrusion extending one small portion of edge thereof. However, in certain embodiments, the elevating protrusion 13 may be provided as extended protrusion 13' as shown in FIG. 24.

In certain embodiments, the inner support plate 40 may further comprise a plurality of fastening holes 44 as shown in FIG. 6. These holes 44 may be fitted and fastened to corresponding bumps 19 provided in the inner surface of the body 10 as shown in FIG. 8.

Alternatively, the inner support plate 40 may be fixed to the body 10 through gluing of course.

In FIG. 9, the pop-up plate 20 may further comprise a groove in central portion thereof. Alternatively, the pop-up plate 20 may have a flat bottom (not shown).

Figure 14:
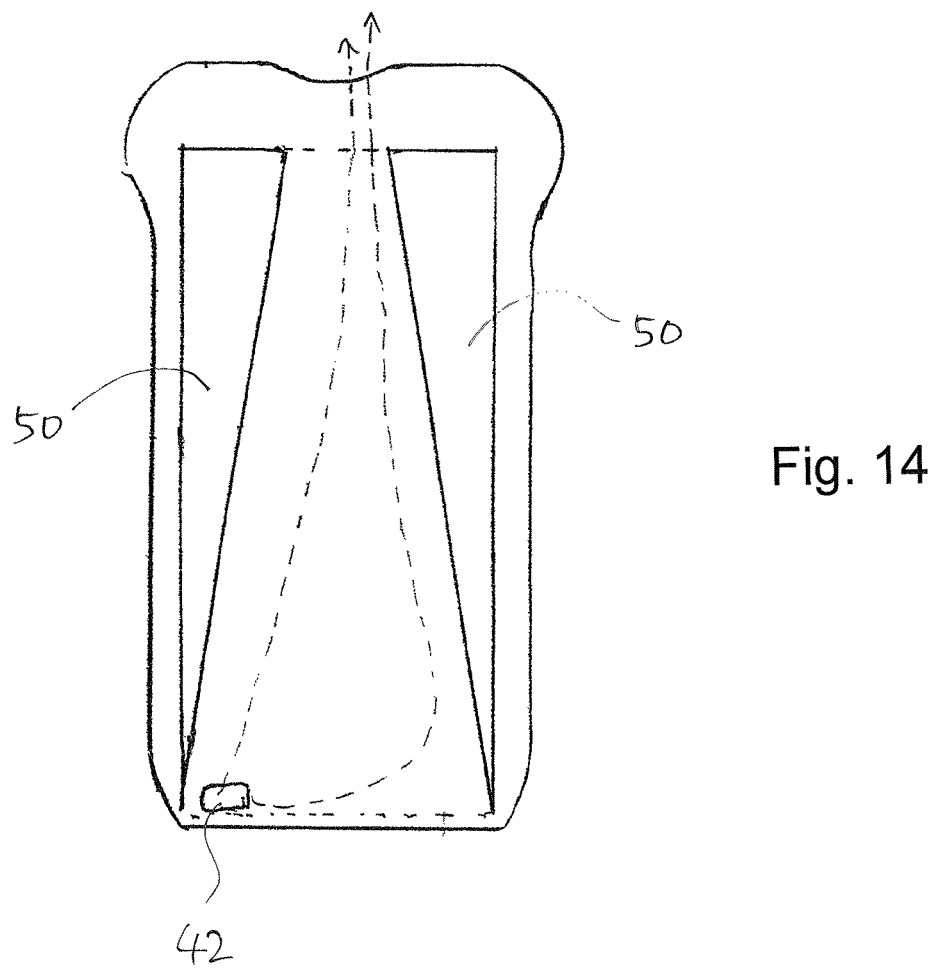
FIG. 14 is a front view of the mobile device case showing paths of sound according to still another embodiment of the invention.

FIG. 14 shows a front view of the mobile device case 100 showing paths of sound through the amplifier 50.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A sound-amplifying case for a mobile device with a front face, a rear face, a top edge, a bottom edge, two side edges, a camera lens, and a speaker, the mobile device case comprising:

a body for covering the rear face of the mobile device and comprising a plurality of fastening portions configured to fasten the mobile device, a plurality of utility holes for exposing portions of the mobile device, a base groove, and a cut-out opening provided at a part of the base groove;

a pop-up plate with an edge hinged to a portion of the body so as to cover the cut-out opening of the body;

an inner support plate provided on an inner surface of the base groove so as to cover the cut-out opening, the inner support plate comprising one or more sound-guiding holes for guiding sound from the mobile device into a gap between the inner support plate and the pop-up plate;

a wedge-shape bellow sound amplifier provided between the inner support plate and the pop-up plate configured for amplifying the sound through the one or more sound-guiding holes from the mobile device;

a plurality of first magnets provided in the pop-up plate for attracting and holding the pop-up plate to the inner support plate; and a spring device provided between the pop-up plate and the inner support plate, configured for opening the wedge-shaped bellow sound amplifier along with the pop-up plate, wherein the plurality of first magnets and the spring device are configured such that the pop-up plate is kept closed when the pop-up plate is forced to be closed against the cut-out opening and is flipped open when the pop-up plate is detached and opened by a predetermined angle with respect to the hinging edge.

2. The case of claim 1, further comprising an outer support plate provided on an inner surface of the pop-up plate, wherein the outer support plate is attached to an inner surface of the pop-up plate, wherein the wedge-shape bellow sound amplifier provided between the outer support plate and the inner support plate configured for amplifying the sound through the one or more sound-guiding holes from the mobile device.

3. The case of claim 1, wherein the plurality of fastening portions are provided at four corners thereof corresponding to four corners of the mobile device.

4. The case of claim 3, wherein each of the plurality of fastening portions comprises an elastic grasping protrusions configured to extend over and hold the corresponding corner of the mobile device.

5. The case of claim 4, wherein each of the plurality of fastening portions comprises an elevating protrusion for lifting a front surface of the mobile device off a floor.

6. The case of claim 1, wherein the pop-up plate comprises a thumbnail cut-out portion for opening.

7. The case of claim 1, wherein the body further comprises a thumbnail cut-out portion provided next to an edge of the base groove for opening the pop-up plate.

8. The case of claim 1, wherein the wedge-shape bellow sound amplifier comprises two bellows portions, each of which covering side wedge-shape gap between the pop-up plate and the body with substantially right angle with respect to each of the pop-up plate and the body, wherein each bellow comprises a plurality of radial creases.

9. The case of claim 1, wherein the wedge-shaped bellow sound amplifier comprises fan-shaped bellows provided at both sides thereof, and wherein the fan-shaped bellows are configured to limit the opening of the pop-up plate to the predetermined angle.

10. The case of claim 1, wherein the pop-up plate is connected to the body by a hinge.

11. The case of claim 1, wherein each of the first magnets is embedded in the pop-up plate.

12. The case of claim 11, wherein the pop-up plate further comprises a plurality of first protrusions for elevating the surface of the pop-up plate off a floor and preventing it from scratch, and wherein some of the plurality of protrusions are aligned with the first magnets.

13. The case of claim 11, wherein each of the first magnets is covered by a metal cap provided between the pop-up plate and the first magnet so as to reduce leaking of magnetic field outward.

14. The case of claim 1, wherein the spring device comprises a plate spring.

15. The case of claim 14, wherein the plate spring is provided at the edge of the pop-up plate hinged to the portion of the body, by heat-treating the edge.

16. The case of claim 12, wherein the body further comprises a plurality of second protrusions for elevating the surface of the pop-up plate off a floor and preventing it from scratch.

17. The case of claim 16, wherein a height of the second protrusion is higher than a height of the first protrusion.

18. The case of claim 1, further comprising a plurality of second magnets disposed on an outer surface of the body so as to have the case and the mobile device stick to an external metal surface.

19. The case of claim 18, wherein each of the second magnets protrudes more by a predetermined height than the first magnets.

20. The case of claim 1, wherein the spring device comprise a pin spring provided between the pop-up plate and the body.

\* \* \* \* \*